(12) United States Patent
Ardö

(10) Patent No.: US 12,148,216 B2
(45) Date of Patent: Nov. 19, 2024

(54) METHOD AND MONITORING CAMERA FOR HANDLING VIDEO STREAMS

(71) Applicant: Axis AB, Lund (SE)

(72) Inventor: Björn Ardö, Lund (SE)

(73) Assignee: AXIS AB, Lund (SE)

( * ) Notice: Subject to any disclaimer, the term of this patent is extended or adjusted under 35 U.S.C. 154(b) by 365 days.

(21) Appl. No.: 17/669,403

(22) Filed: Feb. 11, 2022

(65) Prior Publication Data

US 2022/0292833 A1 Sep. 15, 2022

(30) Foreign Application Priority Data

Mar. 15, 2021 (EP) ..................................... 21162577

(51) Int. Cl.
*G06V 20/52* (2022.01)
*G06V 10/10* (2022.01)
*G06V 20/40* (2022.01)

(52) U.S. Cl.
CPC .............. *G06V 20/52* (2022.01); *G06V 10/16* (2022.01); *G06V 20/44* (2022.01); *G06V 20/49* (2022.01)

(58) Field of Classification Search
CPC ................ H04N 23/698; G06T 3/4038; G06T 2207/20221; G06T 7/33; G03B 37/00; G03B 37/04; G06V 10/16
See application file for complete search history.

(56) References Cited

U.S. PATENT DOCUMENTS

| 2017/0140791 A1 | 5/2017 | Das et al. |
| 2018/0007263 A1* | 1/2018 | Vandrotti ............. H04N 23/698 |
| 2019/0082103 A1 | 3/2019 | Banerjee et al. |

FOREIGN PATENT DOCUMENTS

| EP | 3404913 A1 | 11/2018 |
| EP | 3419278 A1 | 12/2018 |

* cited by examiner

*Primary Examiner* — Incent Rudolph
*Assistant Examiner* — Raphael Schwartz
(74) *Attorney, Agent, or Firm* — XSENSUS LLP (57) ABSTRACT

The present disclosure relates to a method performed by a monitoring camera (100) for handling a first and a second video stream (201a, 201b). The monitoring camera (100) obtains a first video stream (201a) from a first image sensor (103a) and a second video stream (201b) from a second image sensor (103b). A field of view of the first video stream (201a) partly overlaps with the second video stream (201b). The monitoring camera (100) identifies a moving object (205) in the overlap area (203). The monitoring camera (100) divides the moving object (205) into a plurality of sub objects (210). The monitoring camera (100) performs a hard handover of the sub objects (210) from the first to the second video stream (201a, 201b) when the sub object (210) is within the overlap area (203) and when a point of the sub object (210) passes a border (208).

15 Claims, 6 Drawing Sheets

METHOD AND MONITORING CAMERA FOR HANDLING VIDEO STREAMS

CROSS-REFERENCE TO RELATED APPLICATION

This application claims priority to European Patent Application No. 21162577.7 filed on Mar. 15, 2021, the entire disclosure of which is incorporated by reference herein.

TECHNICAL FIELD

The present disclosure relates generally to a monitoring camera and a method performed by the monitoring camera. More particularly the present disclosure relates to handling a first video stream and a second video stream.

BACKGROUND

Panoramic images, panoramic video streams and panoramic cameras are used in more and more applications and the field is therefore currently developing. Video surveillance is an example of an application of panoramic images, panoramic video streams and panoramic cameras. A panoramic camera may comprise one or more adjacent image sensors adapted to capture images or video streams of a certain scene and with an overlapping field of view. Images from the different image sensors are then stitched together to form one image, i.e., a panoramic image. Such panoramic image may be referred to as a stitched panoramic image. There is a seam, e.g., a stitching line, between the overlapping images.

The process of image stitching comprises several steps and image blending is one of them. There are several types of image blending such as alpha blending, multi-band blending etc. Image blending, or simply blending, is performed in the overlap region or area of the adjacent images. In a camera with two image sensors, the image sensors on either side of the seam contribute to varying degrees. For instance, passing from left to right in the overlap area, the image sensor to the left of the seam may be blended in linearly decreasing from 100% to 0%, while the image sensor to the right of the seam is blended in increasing linearly from 0% to 100%.

In a camera comprising multiple image sensors, the alignment of the image sensors is generally optimized at a fairly large distance from the camera, corresponding to a background in the scene, as misalignments would be noticeable there. Moving objects in the scene will generally be closer to the camera and there may therefore be discontinuities as the moving object crosses the overlap area. This may be annoying to a viewer and may make it difficult to recognize and identify the moving objects correctly.

Therefore, there is a need to at least mitigate or solve this issue.

SUMMARY

An objective of the present disclosure is therefore to obviate at least one of the above disadvantages and to provide improved handling of a first video stream and a second video stream.

According to a first aspect, the objective is achieved by a method performed by a monitoring camera for handling a first video stream and a second video stream. The monitoring camera comprises a first image sensor and a second image sensor. The monitoring camera obtains the first video stream from the first image sensor and the second video stream from the second image sensor. A field of view of the first video stream partly overlaps with a field of view of the second video stream in an overlap area. The monitoring camera identifies a moving object in the overlap area and divides the moving object into a plurality of sub objects. The monitoring camera performs a hard handover of each of the sub objects from the first video stream to the second video stream when the respective sub object is completely within the overlap area and when a point of the respective sub object passes a border in the overlap area.

According to a second aspect, the objective is achieved by a monitoring camera adapted for handling a first video stream and a second video stream. The monitoring camera comprises a first image sensor and a second image sensor. The monitoring camera is adapted to obtain the first video stream from the first image sensor and the second video stream from the second image sensor. A field of view of the first video stream partly overlaps with a field of view of the second video stream in an overlap area. The monitoring camera is adapted to identify a moving object in the overlap area, and to divide the moving object into a plurality of sub objects. The monitoring camera is adapted to perform a hard handover of each of the sub objects from the first video stream to the second video stream when the respective sub object is completely within the overlap area and when a point of the respective sub object passes a border in the overlap area.

Since the moving object is divided into a plurality of sub objects and the hard handover is performed for each of the sub objects, the sub object which may be considered a relevant part of the moving object, can be identified and recognized. Thus, handling of the first video stream and the second video stream is improved.

The present disclosure herein affords many advantages, of which a non-exhaustive list of examples follows:

An advantage of the present disclosure herein is that it is easier to identify the sub objects correctly and it increases the reliability of the recognition of the sub objects.

Another advantage of the present disclosure is that stitching of multiple video streams is improved. The resulting video stream, i.e., the stitched video stream, comprises the sub object in a format making it more useful for a scenario where it is only the sub object that is of interest and where the rest of the moving object is of less interest. Thus, recognition of the sub objects in the video stream is improved.

The present disclosure herein is not limited to the features and advantages mentioned above. A person skilled in the art will recognize additional features and advantages upon reading the following detailed description.

BRIEF DESCRIPTION OF THE DRAWINGS

The present disclosure will now be further described in more detail by way of example only in the following detailed description by reference to the appended drawings and in which.

The drawings are not necessarily to scale and the dimensions of certain features may have been exaggerated for the sake of clarity. Emphasis is instead placed upon illustrating the principle of the present disclosure herein.

DETAILED DESCRIPTION

Figure 1:
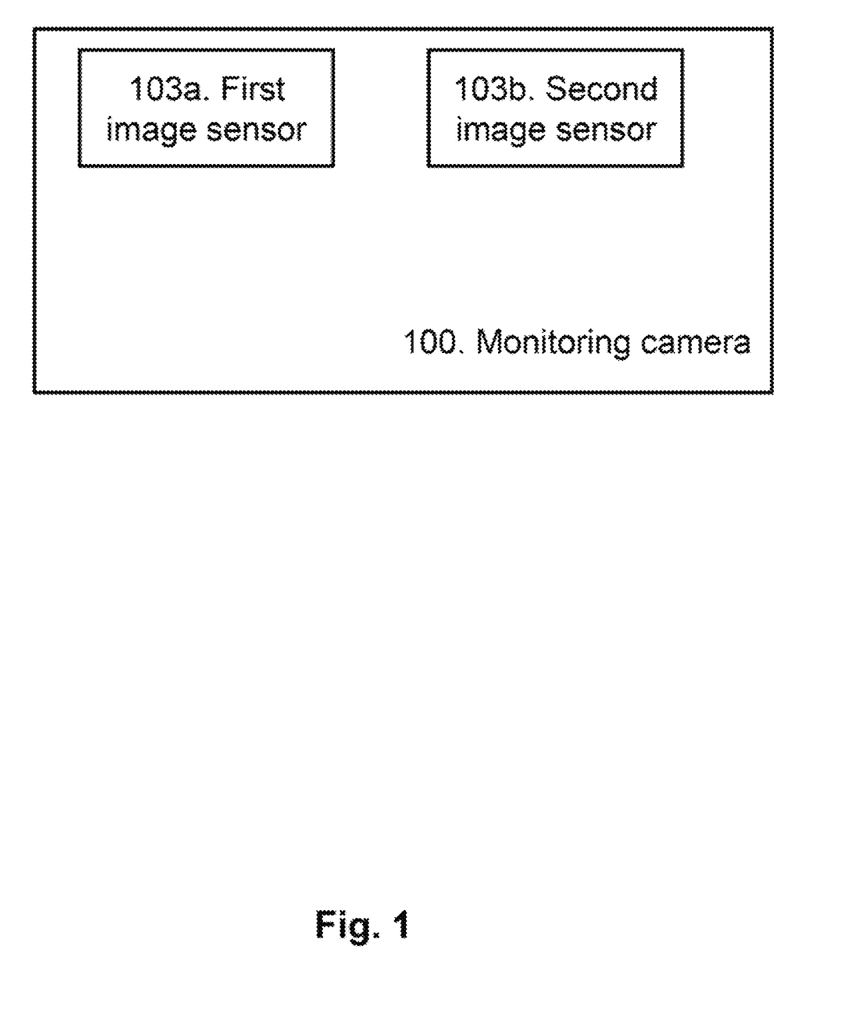
FIG. 1 is a schematic block diagram illustrating a monitoring camera.

FIG. 1 illustrates an example of a monitoring camera 100. The monitoring camera 100 may be a camera adapted to monitor its surroundings, e.g., a scene.

The monitoring camera 100 may be any suitable camera adapted to monitor its' surrounding, e.g., to capture and record images, video streams etc. of the surroundings. The monitoring camera 100 may be referred to as a video camera, a digital camera, a digital monitoring camera, a digital video camera, a surveillance camera, a security camera, an image capturing device, a video stream capturing device etc. The term camera may be used for the sake of simplicity when referring to the monitoring camera 100.

The monitoring camera 100 comprises multiple image sensors 103, e.g., a first image sensor 103a and a second image sensor 103b. Note that two image sensors 103 are used as an example in FIG. 1 and that the monitoring camera 100 may comprise any n number of image sensors, where n is a positive integer. The reference number 103 is used herein when referring to any of the first image sensor 103a and the second image sensor 103b. The first image sensor 103a and the second image sensor 103b may be of the same or different image sensor types.

Each image sensor 103 is adapted to sense the surroundings, i.e., sense the light, and convert it into a video stream. In other words, to capture a video stream of a scene. A video stream may be described as a plurality of images, a recording of a set of images, etc.

The image sensors 103 comprised in the monitoring camera 100 may be adapted to communicate with each other using any suitable wired or wireless communication technology.

The first image sensor 103a and the second image sensor 103b are positioned in the monitoring camera 100 such that they have an overlapping field of view. The first image sensor 103a and the second image sensor 103b may be horizontally arranged, as with respect to the ground, they may be vertically arranged, or they may be arranged in any other suitable way. The first image sensor 103a and the second image sensor 103b may be adjacent to each other, i.e., they may be located next to each other.

Figure 2A:
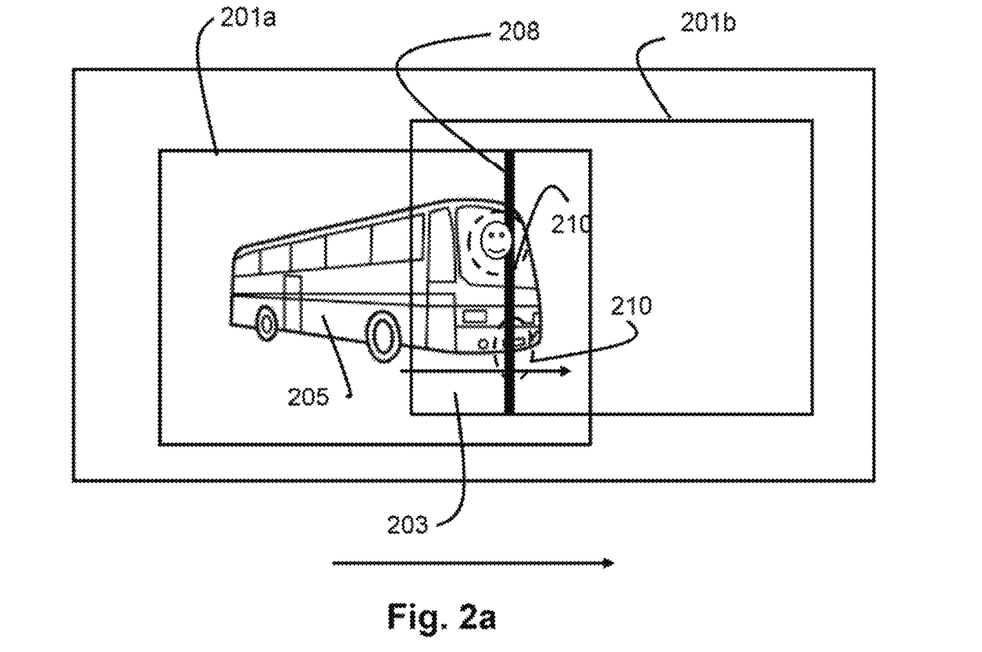
FIG. 2a is a schematic drawing illustrating two video streams.
Figure 2B:
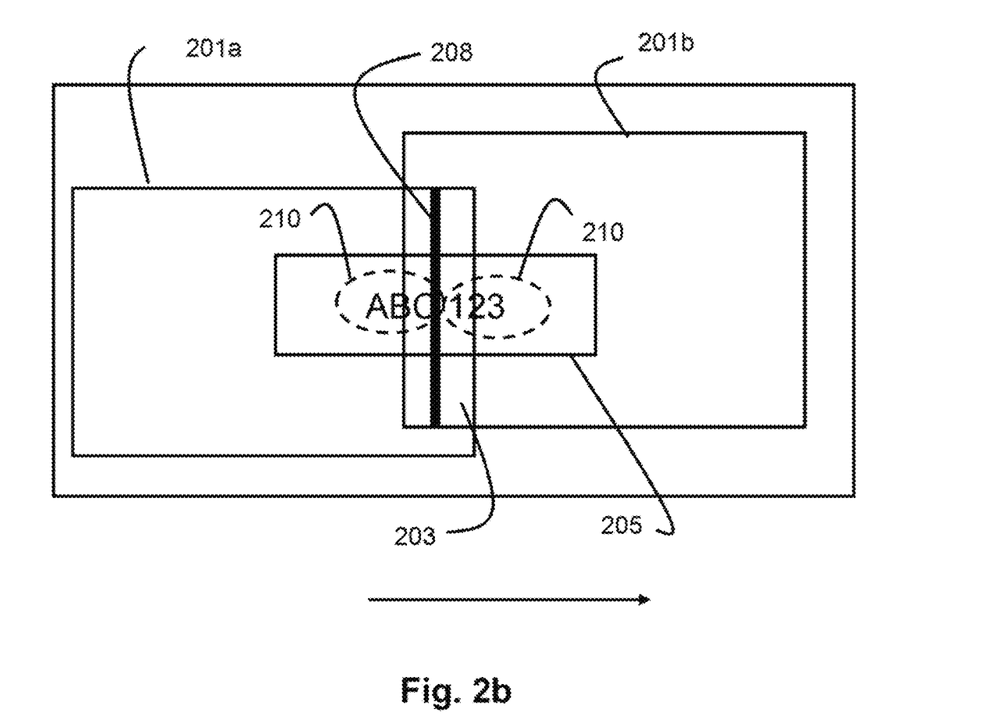
FIG. 2b is a schematic drawing illustrating two video streams.

FIG. 2a and FIG. 2b are schematic drawings illustrating an example of video streams captured by the first image sensor 103a and the second image sensor 103b. FIG. 2a illustrates a bus and FIG. 2b illustrates a license plate on the bus. The scene in which video streams are captured by the first image sensor 103a and the second image sensor 103b may be of a street where busses and cars drive, persons are walking etc. The first image sensor 103a captures a first video stream 201a and the second image sensor 103b captures a second video stream 201b. In the example shown in FIGS. 2a and 2b, the first image sensor 103a is positioned to the left of the second image sensor 103b, and the two image sensors 103a, 103b are horizontally arranged with respect to the ground. Consequently, the first video stream 201a is located to the left of the second video stream 201b.

Even though FIGS. 2a and 2b shows an example with two video streams 201, the present disclosure is equally applicably to any m number of video streams, where m is an integer larger than one.

There is an overlap area 203 between the first video stream 201a and the second video stream 201b. The overlap area 203 may be referred to as an overlay area, a joint area or an intersection area. The overlap area 203 is an area where the field of view of the first image sensor 103a and the second image sensor 103b overlaps. In other words, the first video stream 201 and the second video stream 201b each have image data that represent or show the same, e.g., the same license plate, the same part of a certain scene etc., but possibly from slightly different angels due to for instance parallax. The first video stream 201a and the second video stream 201b each comprises areas outside or in addition to the overlap area 203, i.e., the first image sensor 103a and the second image sensor 103b have non-overlapping fields of view in addition to the overlap area 203.

A moving object 205 is identified in the overlap area 203 and may be exemplified with a bus driving on a road or a person walking on the sidewalk. In FIG. 2a, the moving object 205 is exemplified by a bus moving in the direction illustrated by the arrow. The moving object 205 may extend outside the overlap area 203 in at least one direction, i.e., it may not fit within the overlap area. The moving object 205 may extends outside the overlap area 203 in two directions, both to the right and the left of the overlap area 203. For example, the bus may be too wide to fit within the overlap area 203.

First, the bus is captured by the first image sensor 103a which produces the first video stream 201a. After the bus has moved a certain distance from the left to the right, it enters the field of view of the second image sensor 103b which produces the second video stream 201b. The bus is captured by both the first image sensor 103a and the second image sensor 103b when it is in the overlap area 203. When the license plate 205 is completely outside the overlap area 203, it is captured by only one of the image sensors 103, i.e., either the first image sensor 103a or the second image sensor 203b.

When the moving object 205 does not fit within the overlap area 203, e.g., the bus, has been identified, the moving object 205 is divided into a plurality of sub objects 210. Using the example in FIG. 2a, the license plate may be one sub object 210 and the driver's face may be another sub object 210. The sub object 210 may be referred to as a blob, a partial object etc. The sub objects 210 may have any suitable shape such as a circle, a square, a triangle, an irregular shape, the same shape as the license plate or the driver's face etc.

Depending on how large a part of the overlap area 203 an interesting sub object 210 takes up, it may be necessary to subdivide the sub objects 210 even further. When the sub object 210 is exemplified by a license plate and the entire license plate does not fit within the overlap area 203, as illustrated in FIG. 2b, it may be necessary to treat each letter or number, or groups of letters or numbers on the plate as an individual sub object 210. This means that both the moving object 205 and the sub object 210 may extend outside the overlap area. An interesting sub object 210 may be one that should be further processed or analyzed, e.g., for surveillance purposes such as license plate recognition, face recognition etc.

When the bus moves in the direction from the left to the right as illustrated with the arrow in FIG. 2b, the license plate consequently also moves in the same direction since it is mounted on the bus. First, the license plate is captured by the first image sensor 103a which produces the first video stream 201a. After the bus has moved a certain distance from the left to the right, it enters the field of view of the second image sensor 103b which produces the second video stream 201b. The license plate is captured by both the first image sensor 103a and the second image sensor 103b when it is in the overlap area 203. When the license plate is completely outside the overlap area 203, it is captured by only one of the image sensors 103, i.e., either the first image sensor 103a or the second image sensor 103b.

When the first video stream 201a and the second video stream 201b has been obtained, the two video streams are stitched together to form a resulting video stream, i.e., a panoramic video stream. The first video stream 201a and the second video stream 201b may be source video streams and the panoramic video stream may be a target video stream. Stitching the video streams may be described as combining, joining etc. the video streams.

When the bus and consequently the license plate moves in the direction from the left to the right as illustrated with the arrow in FIGS. 2a and 2b the sub objects 210 also moves in the same direction. When the two video streams 201 are stitched together and as each sub object 210 moves through the overlap area 203 towards and across the border 208 in the overlap area 203, the respective sub object 210 is first represented by image data from only one of the camera sensors 101, e.g., the first camera sensor 103a. When a point of the respective sub object 210 has reached a border 208, it starts to be represented by image data only from the other camera sensor 103, e.g., the second camera sensor 103b. This may be described as performing a hard handover of each of the sub objects 210 from the first video stream 201a to the second video stream 201b. The term "hard" may refer to that the respective sub object 210 is first represented by image data from the first video stream 201a at one time instance and then represented by image data from the second video stream 201b at the next time instance, in other words, there is no gradually or soft handover from the first video stream 201a to the second video stream 201b where image data from both the first video stream 201a and the second video stream 201b are used to represent the sub object 210. The hard handover is between two frames, e.g., two adjacent frames. The sub object 210 is represented by image data either from the first video stream 201a or from the second video stream 201b.

When the sub object 210 moves, e.g., in the direction illustrated by the arrow in FIGS. 2a and 2b, the sub object 210 will first be on one side, e.g., the left side, of the border 208, then it will gradually pass through the border 208 until it is completely on the other side, e.g., the right side, of the border 208. When the sub object 210 is on one side of the border 208, e.g., the left side, and before it passes the border 208, it may be represented by image data from the first video stream 201a. When a certain point comprised in the sub object 210 has passed the border 208, the sub object 210 may be handed over to be completely represented by image data from the second video stream 201b. This point may be located at any suitable location in the sub object 210, e.g., it may be at the center of the sub object 210, it may be at a certain distance from one or both ends of the sub object 210, it may be at one end of the sub object 210 etc. Thus, the sub object 210 may have completely passed the border 208 before it is handed over to be represented by image data comprised in the second video stream 201b, or only a part of the sub object 210 may have passed the border 208 before it is handed over to be represented by image data comprised in the second video stream 201b. The border 208 may extend through a part or the whole the overlap area 203 or it may be a point in the overlap area 203. The border 208 may be located in a region of the overlap area 203 which corresponds to the location of the sub object 210 or it may be located in both regions which corresponds to the location of the sub object 210 and regions where the sub object 210 is not located. The border 208 may extend through the overlap area 203 in any direction, e.g., horizontal, vertical, diagonal etc., and the direction may correspond to the direction in which the first camera sensor 103a and the second camera sensor 103b are arranged with respect to each other.

Figure 2C:
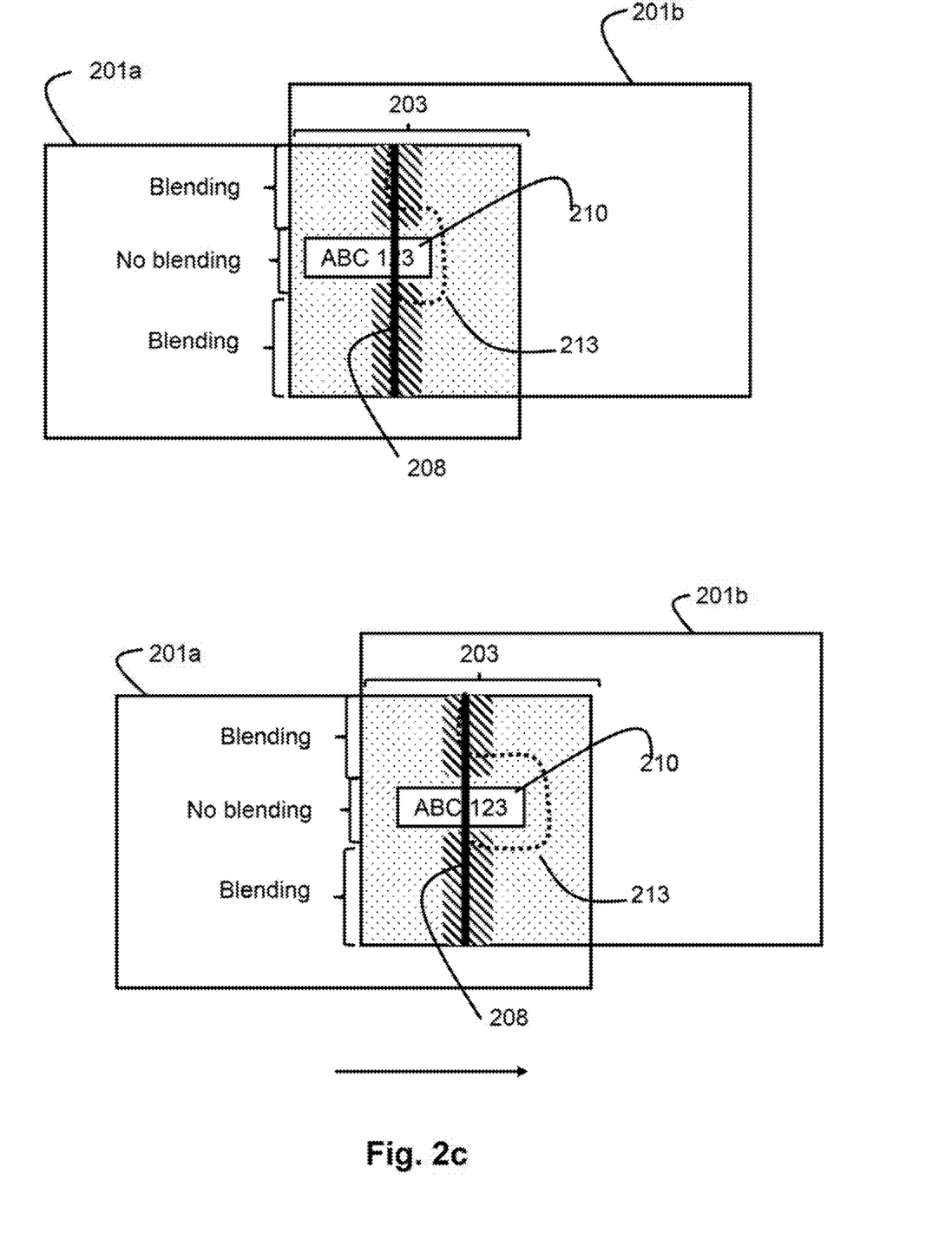
FIG. 2c is a schematic drawing illustrating video streams before handover.
Figure 2D:
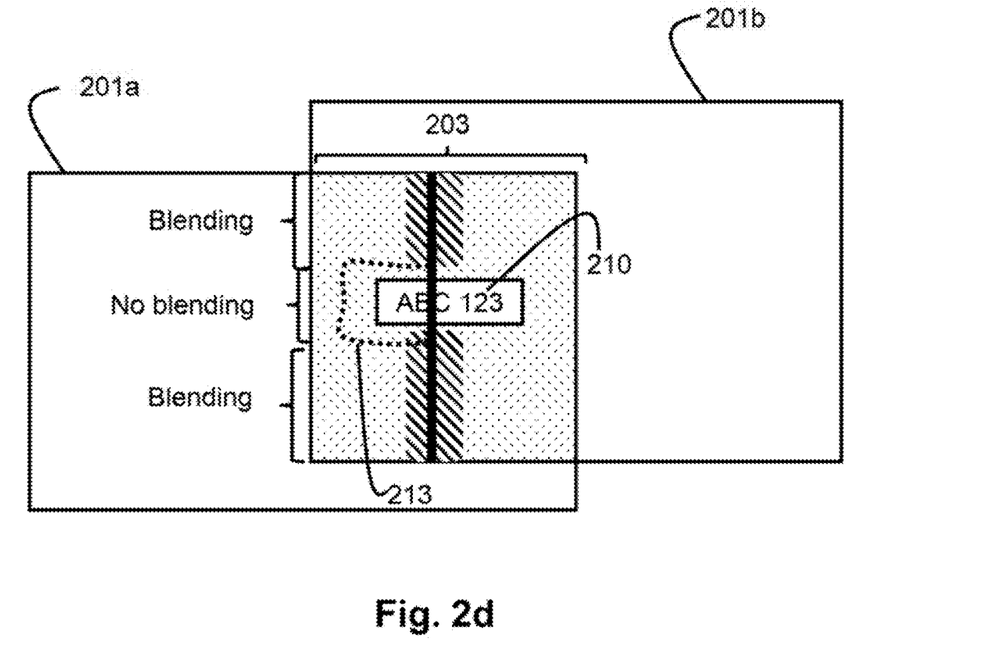
FIG. 2d is a schematic drawing illustrating video streams after handover.

Further details with respect to the handover of image data from the first video stream 201a to the second video stream 201b will now be described with respect to FIG. 2c and FIG. 2d. FIG. 2c is a schematic drawing illustrating an example of the first video stream 201a and the second video stream 201b captured by the first camera sensor 103a and the second camera sensor 103b, respectively. FIG. 2c shows the video streams 201 obtained at time instances t and t+1. FIG. 2d shows the video streams 201 obtained at the time instance t+2. FIG. 2c illustrates an example where the sub object 210 is a license plate on a bus moving in the direction from the left to the right, as seen by the arrow in the figure. Note that the horizontal location of the first camera sensor 103a and the second camera sensor 103b are only used as an example to illustrate the principle, and that the first camera sensor 103a and the second camera sensor 103b may be arranged in any other suitable fashion, e.g., vertically, diagonally etc.

In FIG. 2c, the overlap area 203 is illustrated with a dotted area. When the sub object 210 moves in the exemplified direction from the left to right, see the arrow in FIG. 2c, the sub object 210 is first represented by image data from the first video stream 201a. After a certain distance, the sub object 210 starts to pass the border 208, illustrated with a thick vertical line in FIG. 2c. The top drawing in FIG. 2c illustrates the position of the sub object 210 at a time instance t and after it has started to pass the border 208. The bottom drawing in FIG. 2c illustrates the position of the sub object 210 at a time instance t+1. Thus, the top and bottom drawing in FIG. 2c illustrate the sub object 210 at different time instances. The drawing in FIG. 2d illustrates the position of the sub object 210 at a time instance t+2 which is a later time instance than the bottom drawing in FIG. 2c.

A seam 213, illustrated with a thick dotted line in FIG. 2c, passes through the overlap area 203 in a line which substantially corresponds to the border 208 in the part of the overlap area 203 where the sub object 210 is not located. In the part of the overlap area 203 which comprises the sub object 210, then the seam 213 adaptively follows the sub object 210 when it moves. The seam 213 may follow a first end, exemplified by a right end in FIG. 2c, of the sub object 210 when it moves. When comparing the top and bottom drawings in FIG. 2c, it is seen that the seam 213 adaptively adapts to the movement of the sub object 210. The seam 213 moves closer to the end of the overlap area 203 due to the movement of the sub object 210 in the same direction.

Both the first video stream 201a and the second video stream 201b have the same seam 213 in the top drawing representing time t. The seam 213 is therefore the same when the first video stream 201a and the second video stream 201b represents the same frame in time. In the bottom drawing of FIG. 2c representing the time instance t+1, the first video stream 201a and the second video stream 201b also have the same seam 213, but a seam which is different than the one in the top figure. The seam 213 is different in that it has adapted to the movement of the sub object 210.

Before the handover, at time t and t+1, the sub object 210 is represented by image data from the first video stream 201a and which are on one side of the seam 213, exemplified by the left side in FIG. 2c. The image data on the other side of the seam 213, exemplified by the right side, are not used in the resulting panoramic image since they are redundant.

The sub object 210 is represented by image data from the first video stream 201a which are on one side of the seam 213, e.g., the left side, until a point in the sub object 210 passes the border 208. As mentioned above, the point may be located at any suitable location in the sub object 210, e.g., it may be at the center of the sub object 210, it may be at a certain distance from one or both ends of the sub object 210, it may be at one end of the sub object 210 etc. When the point of the sub object 210 passes the border 208, the sub object is handed over from the first video stream 201a to the second video stream 201b. This point may be for example when the sub object 210 is in the position as exemplified in the bottom drawing of FIG. 2c. After the handover, at time t+2 as exemplified in FIG. 2d, the seam 213 is adapted or moved such that it adaptively follows a second end, e.g., a left end, of the sub object 210 when it moves in the direction of the arrow. The other part of the seam 213 still substantially correspond to the border 208, as before the handover. After the handover, e.g., at time t+2 as illustrated in FIG. 2d, the sub object 210 is represented by image data from the second video stream 201b which are on the second side of the seam 213, e.g., the right side.

In the first video stream 201a, there may be a distance between the seam 213 which adaptively surrounds the first end of the sub object 210 and the corresponding end of the overlap area 203. Similarly, for the second video stream 201b, there may be a distance between the seam 213 which adaptively surrounds the second end of the sub object 210 and the corresponding end of the overlap area 203.

In the process of stitching the video streams 201a, 201b together, image data, i.e., pixels, from the first video stream 201a and the second video stream 201b may or may not be blended in the overlap area 203. Image data in the first video stream 201a and the second video stream 201b which do not represent the sub object 210 may be blended. It may be an area corresponding to or which surrounds the border 208 outside the sub object 210 that may be blended, as illustrated with the diagonally shaded area in FIG. 2c and FIG. 2d. When the image data from the first video stream 201a are blended with the image data from the second video stream 201, the image data are combined with each other for example using a percentage of the image data from both video streams 201, 201b. In the resulting panoramic video stream, the area on which blending has been performed may be seen a sharp image or it may have some sharp parts and some blurred parts. Blurred parts may be due to parallax or lining errors. The part of the overlap area 203 on which blending has not been performed, i.e., the sub object 210, may not be blurred but may be seen as flicking from one video stream to another. In other word, the sub object 210 is clearly seen in the resulting panoramic video stream, and the areas above and below the sub object 210 around the border 208 may be blurred.

The blending may be done using a blending algorithm. Use of the blending algorithm on image data except for the sub object 210 may be a default setting, i.e., it may be turned on when the stitching procedure is performed, the use of the blending algorithm may be determined when the method is executed, or it may be determined for each sub object 210. Any suitable type of blending algorithm may be used such as for example alpha blending, multi-band blending etc.

In another example, the face of the bus driver may be the moving object 205 that is of interest. Different moving objects 205 may be classified as belonging to a certain object class. A moving object 205 may be a prioritized object or a non-prioritized object. When for example the bus has several moving objects 205 such as the license plate and the driver's face, the license plate may be a prioritized object and the driver's face may be a non-prioritized object. Thus, the license plate may be the moving object that is subject to the division into sub objects and the hard handover. The driver's face may not be subject to the division into sub objects and the hard handover, or it may be subject to the division into sub objects and the hard handover at a later time, i.e., after the license plate has been subject to the division into sub objects and the hard handover. The prioritization may be pre-determined by a user.

Figure 3:
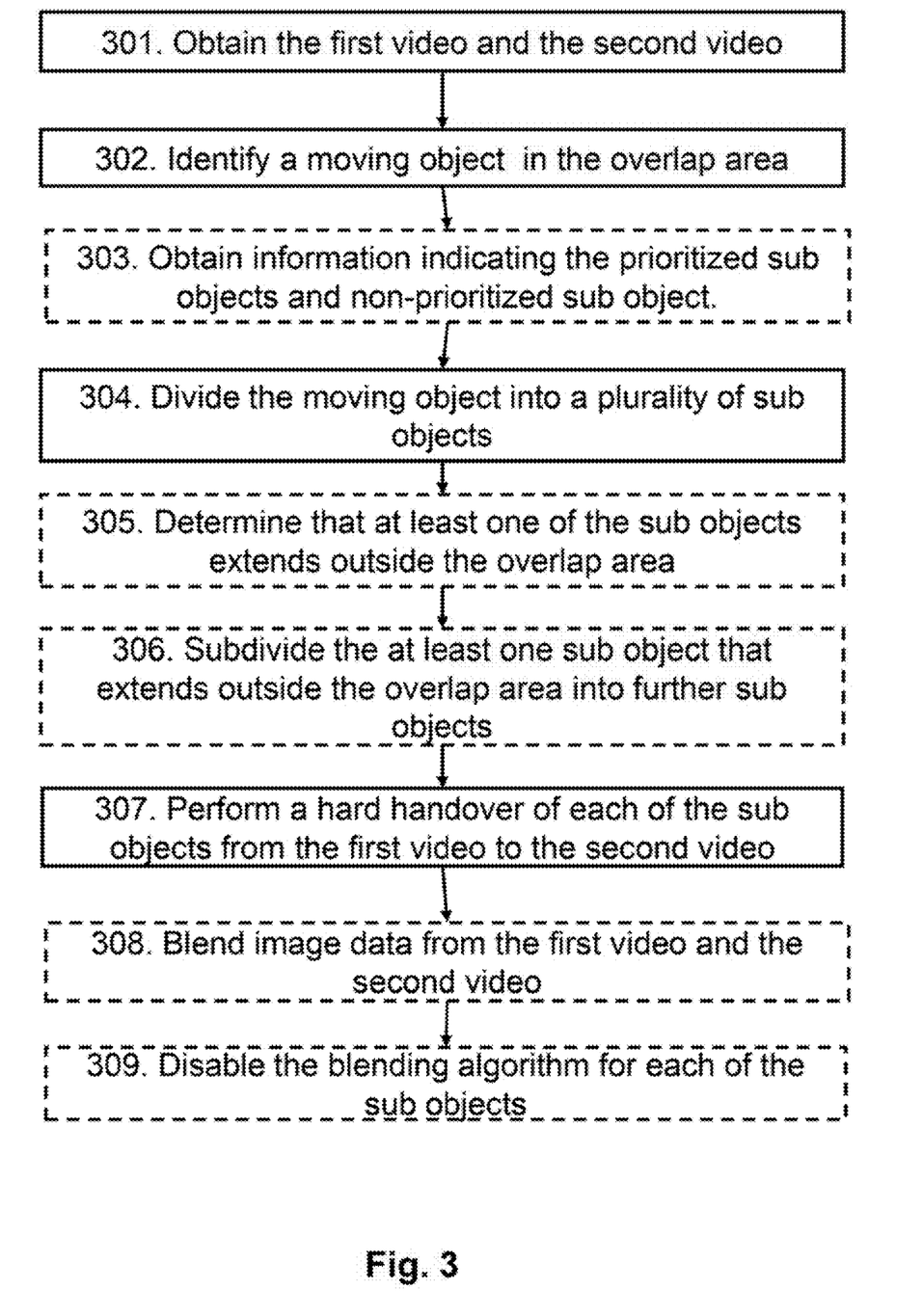
FIG. 3 is a flow chart illustrating a method.

The method described above will now be described seen from the perspective of the monitoring camera 100. FIG. 3 is a flowchart describing the present method in the monitoring camera 100 for handling a first video stream 201a and a second video stream 201b. The monitoring camera 100 comprises a first image sensor 103a and a second image sensor 103b. Steps illustrated with dotted boxes in FIG. 3 are optional steps. The method comprises at least one of the following steps to be performed by the monitoring camera 100, which steps may be performed in any suitable order than described below:

Step 301

The monitoring camera 100 obtains the first video stream 201a from the first image sensor 103a and the second video stream 201b from the second image sensor 103b. A field of view of the first video stream 201a partly overlaps with a field of view of the second video stream 201b in an overlap area 203. The first video stream 201a and the second video stream 201b may be obtained directly from the respective image sensor 103 or via some other entity, e.g., a local memory comprised in the monitoring camera 100, a cloud memory.

Step 302

The monitoring camera 100 identifies a moving object 205 in the overlap area 203. The moving object may be for example a bus driving on the street or a person who is walking. The moving object 205 may extend outside the overlap area 203 in at least one direction.

Step 303

The monitoring camera 100 may obtain information indicating prioritized sub objects and non-prioritized sub objects.

The moving object 205 may belong to an object class. The object class may be associated with prioritized sub objects and non-prioritized sub objects. The plurality of sub objects which the moving object 205 is divided into in step 308 and on which hard handover is performed in step 309 may be the prioritized sub objects. In an example where a bus is the moving object 205, then the license plate may be a prioritized sub object and the driver's face may be a non-prioritized sub object. In another example, the license plate may be a prioritized sub object and the headlight(s) next to the license plate may be a non-prioritized sub object.

Information indicating prioritized sub objects and non-prioritized sub objects may be obtained from a local memory comprised locally in the monitoring camera 100, a cloud memory, a central memory storage or in any other suitable memory. The information may be predefined for example by an operator of the monitoring camera 100, it may be provided to the monitoring camera 100 during its operation, it may be obtained by the monitoring camera 100 upon request or in any other suitable fashion.

Step 304

The monitoring camera 100 divides the moving object 205 into a plurality of sub objects 210. The sub object 210 may be a license plate on the bus or the person's face.

Step 305

The monitoring camera 100 may determine that at least one of the sub objects 210 extends outside the overlap area 203.

Step 306

The monitoring camera 100 may subdivide the at least one sub object 210 that extends outside the overlap area 203 into further sub objects 210, and the hard handover in step 309 below may be performed on the further sub objects 210. For example, if the moving object 203 is a bus and the sub object is a license plate, then the further sub objects may be each letter and/or digit on the license plate.

Step 307

The monitoring camera 100 performs a hard handover of each of the sub objects 210 from the first video stream 201a to the second video stream 201b when the respective sub object 210 is completely within the overlap area 203 and when a point of the respective sub object 210 passes a border 208 in the overlap area 203. The hard handover is from the first video stream 201a taken at one time instance and to the second video stream 201b taken at the next time instance, i.e., the hard handover is between two frames taken at different time instances.

The respective sub object may be represented by image data from the first video stream 201a before the hard handover, and the respective sub object 210 may be represented by image data from the second video stream 201b after the hard handover.

Before the hard handover, a seam 213 may extend through the overlap area 203 and adaptively surround a first end of each respective sub object 210 when the respective sub object 210 moves through the overlap area 203. After the hard handover, the seam 213 may be moved such that it extends through the overlap area 203 and adaptively surrounds a second end of each respective sub object 210 when the respective sub object 210 moves through the overlap area 203. The first end may be an opposite end of the second end. The respective sub object 210 may be represented by image data from the first video stream 201a on a first side of the seam 213 before the hard handover. The respective sub object 210 may be represented by image data from the second video stream 201b on a second side of the seam 213 after the hard handover.

Step 308

The monitoring camera 100 may blend, using a blending algorithm, image data from the first video stream 201a and the second video stream 201b other than image data of the sub object 210 in the overlap area 203.

Using other words, the monitoring camera 100 may blend image data in regions of the first video stream 201a and the second video stream 201b for which the blending algorithm is enabled, i.e., in regions where the blending algorithm is not disabled. The regions where the blending algorithm is enabled, i.e., not disabled, are regions comprising image data which do not represent or is comprised in the sub object 210. Blending may be seen an optional step.

Step 309

The monitoring camera 100 may disable the blending algorithm for each of the sub objects 210. Using other words, the monitoring camera 100 may disable the blending algorithm in regions of the first video stream 201a and the second video stream 201b which represent the sub object 210, i.e., regions which comprises image data comprised in the sub object 210. Blending may therefore not be performed on the sub object 210.

The blending algorithm may be disabled for each of the sub objects 210 and enabled for the remaining image data, as default or it may be determined for each time the method is executed or determined for each sub object 210.

After at least some of the steps in FIG. 3 has been performed, the first video stream 201a and the second video stream 201b together may provide a panoramic video stream.

Figure 4:
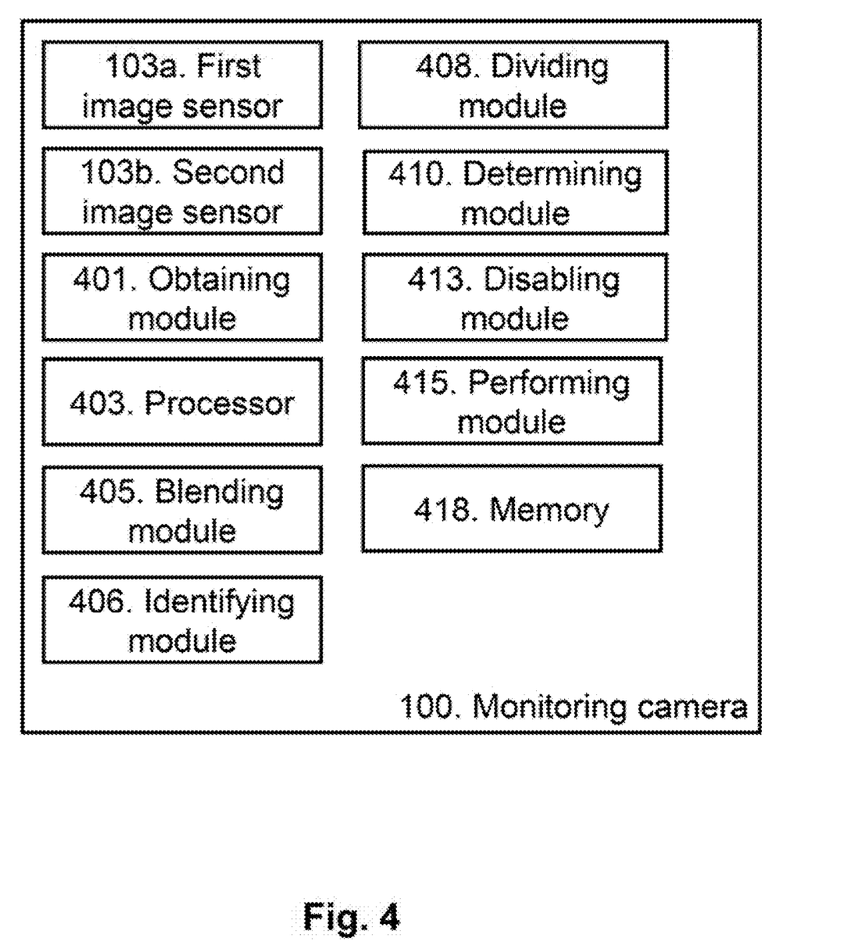
FIG. 4 is a schematic block diagram illustrating a monitoring camera.

To perform the method steps shown in FIG. 3 for handling a first video stream 201a and a second video stream 201b, the monitoring camera 100 may comprise an arrangement as shown in FIG. 4. In addition to the arrangement illustrated in FIG. 4, the monitoring camera 100 comprises the first image sensor 103a and the second image sensor 103b, as illustrated in FIG. 1.

The monitoring camera 100 is adapted to, e.g., by means of an obtaining module 401, obtain the first video stream 201a from the first image sensor 103a and the second video stream 201b from the second image sensor 103b. A field of view of the first video stream 201a partly overlaps with a field of view of the second video stream 201b in an overlap area 203. The first video stream 201a and the second video stream 201b may be obtained directly from the respective image sensor 103 or via some other entity, e.g., a local memory comprised in the monitoring camera 100, a cloud memory. The obtaining module 401 may also be referred to as an obtaining unit, an obtaining means, an obtaining circuit, means for obtaining etc. The obtaining module 401 may be a processor 403 of the monitoring camera 100 or comprised in the processor 403 of the monitoring camera 100.

The monitoring camera 100 may be adapted to, e.g., by means of a blending module 405, blend image data from the first video stream 201a and the second video stream 201b other than of the sub object 210 in the overlap area 203 using a blending algorithm. A default setting may be that the blending algorithm is enabled for the image data other than of the sub object 210 and disabled for image data representing the sub object 210. The blending module 405 may also be referred to as a blending unit, a blending means, a blending circuit, means for blending etc. The blending module 405 may be the processor 403 of the monitoring camera 100 or comprised in the processor 403 of the monitoring camera 100.

The monitoring camera 100 is adapted to, e.g., by means of an identifying module 406, identifies a moving object 205 in the overlap area 203. The moving object may be for example a bus driving on the street or a person who is walking. The moving object 205 may extend outside the overlap area 203 in at least one direction. The identifying module 406 may also be referred to as an identifying unit, an identifying means, an identifying circuit, means for identifying etc. The identifying module 406 may be the processor 403 of the monitoring camera 100 or comprised in the processor 403 of the monitoring camera 100.

The monitoring camera 100 may be adapted to, e.g., by means of the obtaining module 401, obtain information indicating prioritized sub objects and non-prioritized sub objects.

The moving object 205 may belong to an object class. The object class may be associated with prioritized sub objects and non-prioritized sub objects. The plurality of sub objects which the moving object 205 is divided into and on which hard handover is performed may be the prioritized sub objects. In an example where a bus is the moving object 205, then the license plate may be a prioritized sub object and the driver's face may be a non-prioritized sub object.

The monitoring camera 100 is adapted to, e.g., by means of a dividing module 408, divide the moving object 205 into a plurality of sub objects 210. The sub object 210 may be a license plate on the bus or the person's face. The dividing module 408 may also be referred to as a dividing unit, a dividing means, a dividing circuit, means for dividing etc. The dividing module 408 may be the processor 403 of the monitoring camera 100 or comprised in the processor 403 of the monitoring camera 100.

The monitoring camera 100 may be adapted to, e.g., by means of a determining module 410, determine that at least one of the sub objects 210 extends outside the overlap area 203. The determining module 410 may also be referred to as a determining unit, a determining means, a determining circuit, means for determining etc. The determining module 410 may be the processor 403 of the monitoring camera 100 or comprised in the processor 403 of the monitoring camera 100.

The monitoring camera 100 may be adapted to, e.g., by means of the dividing module 408, subdivide the at least one sub object 210 that extends outside the overlap area 203 into further sub objects 210, and the hard handover in step 309 below may be performed on the further sub objects 210. For example, if the moving object 203 is a bus and the sub object is a license plate, then the further sub objects may be each letter and/or number on the license plate.

The monitoring camera 100 may be adapted to, e.g., by means of a disabling module 413, disable the blending algorithm for image data representing each of the sub objects 210. The disabling module 413 may also be referred to as a disabling unit, a disabling means, a disabling circuit, means for disabling etc. The disabling module 413 may be the processor 403 of the monitoring camera 100 or comprised in the processor 403 of the monitoring camera 100.

The monitoring camera 100 is adapted to, e.g., by means of a performing module 415, perform a hard handover of each of the sub objects 210 from the first video stream 201*a* to the second video stream 201*b* when the respective sub object 210 is completely within the overlap area 203 and when a point of the respective sub object passes a border 208 within the overlap area 203. The hard handover is from the first video stream 201*a* taken at one time instance and to the second video stream 201*b* taken at the next time instance, i.e., the hard handover is between two frames taken at different time instances. The performing module 415 may also be referred to as a performing unit, a performing means, a performing circuit, means for performing etc. The performing module 415 may be the processor 403 of the monitoring camera 100 or comprised in the processor 403 of the monitoring camera 100.

The respective sub object 210 may be represented by image data from the first video stream 201*a* before the hard handover, and the respective sub object 210 may be represented by image data from the second video stream 201*b* after the hard handover.

Before the hard handover, a seam 213 may extend through the overlap area 203 and adaptively surround a first end of each respective sub object 210 when the moving object 210 moves through the overlap area 203. After the hard handover, the seam 213 may be moved such that it extends through the overlap area 203 and adaptively surround a second end of each respective sub object 210 when the respective sub object 210 moves through the overlap area 203. The first end may be an opposite end of the second end. The respective sub object 210 may be represented by image data from the first video stream 201*a* on a first side of the seam 213 before the hard handover, and the respective sub object 210 may be represented by image data from the second video stream 201*b* on a second side of the seam 213 after the hard handover.

The first video stream 201*a* and the second video stream 201*b* together may provide a panoramic video stream.

The monitoring camera 100 comprises the processor 403 and a memory 418. The memory 418 comprises instructions executable by the processor 403.

The present mechanism for handling a first video stream 201*a* and a second video stream 201*b* may be implemented through one or more processors, such as a processor 403 in the arrangement depicted in FIG. 4, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the monitoring camera 100. One such carrier may be in the form of a CD ROM disc. It is however feasible with other data carriers such as a memory stick. The computer program code can furthermore be provided as pure program code on a server and downloaded to the monitoring camera 100.

A computer program may comprise instructions which, when executed on at least one processor, cause the at least one processor to carry out the method steps of FIG. 3. A carrier may comprise the computer program, and the carrier is one of an electronic signal, optical signal, radio signal or computer readable storage medium.

The term "at least one of A and B" should be understood to mean "only A, only B, or both A and B.", where A and B are any parameter, number, indication used herein etc.

It should be emphasized that the term "comprises/comprising" when used herein is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the present disclosure herein, be performed in another order than the order in which they appear in the claims.

The invention claimed is:

1. A method performed by a monitoring camera for handling a first video stream and a second video stream, wherein the monitoring camera comprises a first image sensor and a second image sensor, the method comprising:
   obtaining the first video stream from the first image sensor and the second video stream from the second image sensor,
   wherein a field of view of the first image sensor partly overlaps with a field of view of the second image sensor in an overlap area;

identifying a moving object in the overlap area;
dividing the moving object into a plurality of sub objects;
performing a hard handover of each of the plurality of sub objects from the first video stream to the second video stream based on respective ones of the plurality of sub objects being completely within the overlap area and based on a point of the respective ones of the plurality of sub objects passing a border within the overlap area,
wherein each of the respective ones of the plurality of sub objects is represented by image data from the first video stream before the hard handover, and each of the respective ones of the plurality of sub objects is represented by image data from the second video stream after the hard handover;
blending the image data from the first video stream and image data from the second video stream, other than the image data of the respective ones of the plurality of sub objects from the second video stream, in the overlap area using a blending algorithm;
disabling the blending algorithm for image data representing each of the plurality of sub objects;
determining that at least one of the plurality of sub objects extends outside the overlap area; and
subdividing the at least one of the plurality of sub objects that extends outside the overlap area into further sub objects,
wherein the hard handover is performed on the further sub objects.

2. The method according to claim 1,
wherein, before the hard handover, a seam extends through the overlap area and adaptively surrounds a first end of each of the plurality of sub objects based on each of the sub objects from the first video stream moving through the overlap area;
wherein, after the hard handover, the seam is moved such that it extends through the overlap area and adaptively surrounds a second end of each of the plurality of sub objects based on each of the plurality of sub objects moving through the overlap area,
wherein the first end is an opposite end of the second end;
wherein each of the plurality of sub objects is represented by image data from the first video stream on a first side of the seam before the hard handover, and
wherein each of the plurality of sub objects is represented by image data from the second video stream on a second side of the seam after the hard handover.

3. The method according to claim 1,
wherein the moving object belongs to an object class,
wherein the object class is associated with prioritized sub objects and non-prioritized sub object, and
wherein sub objects of the plurality of sub objects which the moving object is divided into and on which hard handover is performed are the prioritized sub objects.

4. The method according to claim 3, further comprising:
obtaining information indicating the prioritized sub objects and the non-prioritized sub objects.

5. The method according to claim 1, wherein the blending algorithm is enabled as a default setting.

6. The method according to claim 1, wherein the moving object extends outside the overlap area in at least one direction.

7. The method according to claim 1, wherein the first video stream and the second video stream together provide a panoramic video stream.

8. A monitoring camera comprising:
a first image sensor;
a second image sensor; and
circuitry configured to
obtain a first video stream from the first image sensor and a second video stream from the second image sensor,
wherein a field of view of the first image sensor partly overlaps with a field of view of the second image sensor in an overlap area,
identify a moving object in the overlap area, the object is a moving object,
divide the moving object into a plurality of sub objects,
perform a hard handover of each of the plurality of sub objects from the first video stream to the second video stream based on respective ones of the plurality of sub objects being completely within the overlap area and based on a point of the respective ones of the plurality of sub objects passing a border within the overlap area,
wherein each of the respective ones of the plurality of sub objects is represented by image data from the first video stream before the hard handover, and each of the respective ones of the plurality of sub objects is represented by image data from the second video stream after the hard handover,
blend the image data from the first video stream and image data from the second video stream, other than the image data of the respective ones of the plurality of sub objects from the second video stream, in the overlap area using a blending algorithm,
disable the blending algorithm for image data representing each of the plurality of sub objects,
determine that at least one of the plurality of sub objects extends outside the overlap area; and
subdivide the at least one of the plurality of sub objects that extends outside the overlap area into further sub objects,
wherein the hard handover is performed on the further sub objects.

9. The monitoring camera according to claim 8, wherein
before, the hard handover, a seam extends through the overlap area and adaptively surrounds a first end of each of the plurality of sub objects based on each of the sub objects from the first video stream moving through the overlap area,
after the hard handover, the seam is moved such that it extends through the overlap area and adaptively surrounds a second end of each of the plurality of sub objects based on each of the plurality of sub objects moving through the overlap area,
wherein the first end is an opposite end of the second end,
each of the plurality of sub objects is represented by image data from the first video stream on a first side of the seam before the hard handover, and
each of the plurality of sub objects is represented by image data from the second video stream on a second side of the seam after the hard handover.

10. The monitoring camera according to claim 8, wherein
the moving object belongs to an object class,
the object class is associated with prioritized sub objects and non-prioritized sub object, and
the sub objects of the plurality of sub objects which the moving object is divided into and on which hard handover is performed are the prioritized sub objects.

11. The monitoring camera according to claim 8, wherein the circuitry is further configured to obtain information indicating the prioritized sub objects and the non-prioritized sub objects.

12. The monitoring camera according to claim 8, wherein the blending algorithm is enabled as a default setting.

13. The monitoring camera according to claim 8, wherein the moving object extends outside the overlap area in at least one direction.

14. The monitoring camera according to claim 8, wherein the first video stream and the second video stream together provide a panoramic video stream.

15. A non-transitory computer-readable storage medium that contains computer-readable instructions that when executed on at least one processor, cause the at least one processor to carry out a method, the method comprising:

obtaining the first video stream from the first image sensor and the second video stream from the second image sensor, wherein a field of view of the first image sensor partly overlaps with a field of view of the second image sensor in an overlap area;

identifying a moving object in the overlap area;

dividing the moving object into a plurality of sub objects;

performing a hard handover of each of the plurality of sub objects from the first video stream to the second video stream based on respective ones of the plurality of sub objects being completely within the overlap area and based on a point of the respective ones of the plurality of sub objects passing a border within the overlap area, wherein each of the respective ones of the plurality of sub objects is represented by image data from the first video stream before the hard handover, and each of the respective ones of the plurality of sub objects is represented by image data from the second video stream after the hard handover;

blending the image data from the first video stream and image data from the second video stream, other than the image data of the respective ones of the plurality of sub objects from the second video stream, in the overlap area using a blending algorithm;

disabling the blending algorithm for image data representing each of the plurality of sub objects;

determining that at least one of the plurality of sub objects extends outside the overlap area; and subdividing the at least one of the plurality of sub objects that extends outside the overlap area into further sub objects, wherein the hard handover is performed on the further sub objects.

* * * * *